June 21, 1932. A. K. HUNTLEY 1,863,794
DRY CELL BATTERY
Original Filed Aug. 9, 1927
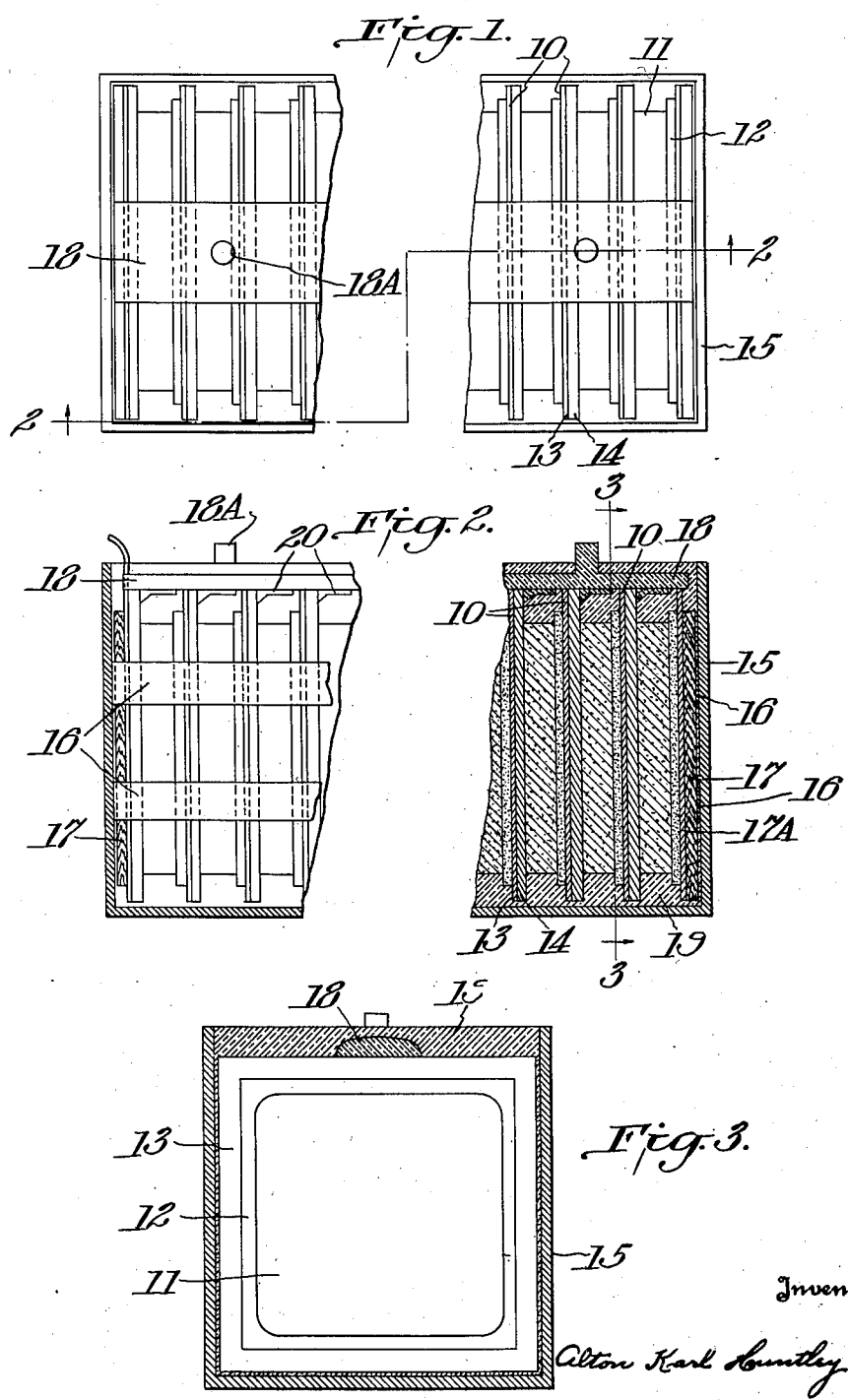

Patented June 21, 1932

1,863,794

UNITED STATES PATENT OFFICE

ALTON KARL HUNTLEY, OF CLEVELAND, OHIO, ASSIGNOR TO NATIONAL CARBON COMPANY, INC., A CORPORATION OF NEW YORK

DRY CELL BATTERY

Original application filed August 9, 1927, Serial No. 211,769, and in Canada January 16, 1928. Divided and this application filed March 24, 1930. Serial No. 438,535.

This invention relates to dry cells, and more particularly to a method of assembly for use with a battery of dry cells having certain venting features. My copending application Serial Number 211,769, filed August 9, 1927, of which this application is a division, discloses and claims a battery having porous venting members adapted to lead gases from the interior of the cell to the atmosphere. The present application relates to the method of incorporating such venting features into a battery assembly.

The principal object of this invention is to provide an inexpensive and simple method of assembly which will require a minimum of hand operations, and by means of which the proper functioning of the venting elements is insured with the exercise of very little care or skill during the dipping and sealing operation.

A description of the accompanying drawing will illustrate one modification of my invention as applied to a flat type battery in which capillary passages are provided between the interior of the battery and the atmosphere so as to bring about controlled venting.

Fig. 1 is a top plan view of a battery assembly with the seal removed but with one embodiment of a venting member shown in place on the battery assembly.

Fig. 2 is a longitudinal view on the line 2—2 of Fig. 1 showing one-half of the battery assembly in section and the other half in side elevation.

Fig. 3 is a sectional view taken on the line 3—3 of Fig. 2.

The battery shown in the drawing comprises a plurality of "duplex" electrodes 10, mix cakes 11 and bibulous spacers 12 associated in a compact assembly to form a multi-cell battery of the flat type such as is disclosed in U. S. patent to Rider and Huntley, No. 1,508,987. Each of the so-called "duplex" electrodes comprises a plate or strip of zinc 13 provided with a coating 14 of a carbon-containing plastic possessing electrically conductive properties.

The battery assembly may be built up directly within the battery container 15 or formed into a unitary assembly outside the container and then inserted therein. The latter procedure is indicated as having been followed in Fig. 2, in which 16 are strips of a suitable paper tape used to bind the assembly. Wooden end boards 17 are shown. One end-electrode is also shown as consisting of a plain uncoated zinc plate 17a. Before the assembly is placed within the container 15 a bar 18 with two extending horns 18a of the same material as the bar is attached to the edges of the duplex electrodes of the undipped assembly.

The bar and horns thereon may consist of any material having the desired porosity, and adequate resistance to the temperature of the seal material. The base is sufficiently low to permit it to be completely covered by the seal compound. In order to insure good contact with the upper edge portions of each of the electrodes the bottom of the bar may be coated with a thin layer of a suitably porous adhesive. The porous adhesive 20 serves a dual purpose in affording an improved mechanical bonding between the bar and the elements of the assembly, and in furnishing increased porous area for the flow of gas from the electrode coating to the bar.

After the bar 18 is suitably attached the entire assembly and bar are dipped in the usual compound of a molten insulating plastic, the dipped assembly is inserted in the container 15, and the usual sealing plastic 19 is added. The sealing plastic is poured over the assembly and caused to flow into the spaces around the bottom and sides of the assembly so as to completely surround it with the exception of the horns 18a of the bar 18, These horns appear as protuberances covered with dipping compound. They are cut off level with the seal so that the bare surfaces of the bar material are exposed to act as the eventual outlets for the vented gases.

The size and shape of the venting member 18 may be varied depending upon the porosity of the material used and upon the venting capacity desired. The nature of the particular venting material forms no part of the present invention, as it is evident that the method of arranging a gas outlet as described may be applied to any sort of material having the required porosity. The venting capacity may be controlled within certain predetermined limits which will vary in accordance with the size and other characteristics of the cell.

I claim:

1. A method of forming a battery of dry cells which comprises assembling the active elements; placing a porous member adjacent to and communicating with said active elements, said member having a portion thereof extending above the normal level of the seal; pouring the seal; and removing that portion of said porous element which extends above the seal.

2. A method of forming a battery of dry cells which comprises assembling the active elements including a depolarizing mix, placing a porous member having an extending portion adjacent to and communicating with said active elements, dipping into a molten plastic, covering with a sealing material all but the coated extending portion of the porous member, and cutting off said extending portion flush with the seal level.

3. A method of assembling a battery of flat dry cells which comprises forming a unitary structure of the desired number of cells, placing porous venting members having extending portions in communication with the active cell elements, dipping the assembly thus formed in a bath of molten insulating plastic, inserting into a container, covering all but the coated extending portions of the venting members with a sealing material, and cutting off said extending portions flush with the seal.

4. A method of assembling a battery of flat dry cells which comprises forming a unitary structure of the desired number of cells; placing porous venting members in contact with the active cell elements, said members having portions thereof adapted to extend above the normal seal level; entirely covering the assembly thus formed with an insulating plastic; sealing the same in a container; and severing the coated portions of the venting members which extend above the seal, whereby uncovered sections of the venting members are exposed to the atmosphere.

5. A method of making dry cells comprising the steps of assembling a depolarizing cathode with an anode, installing a porous member in a position wherein one portion thereof is adjacent to the depolarizing cathode, said porous member having a projecting part, completely coating the assemblage with molten plastic, causing the latter to solidify, and then severing the projecting part of the porous member and the plastic encasing it to expose the porous member.

In testimony whereof, I affix my signature.

ALTON KARL HUNTLEY.